US011743933B2

(12) United States Patent
Sun et al.

(10) Patent No.: US 11,743,933 B2
(45) Date of Patent: *Aug. 29, 2023

(54) WIRELESS COMMUNICATION METHOD AND WIRELESS COMMUNICATION DEVICE

(71) Applicant: Sony Group Corporation, Tokyo (JP)

(72) Inventors: Chen Sun, Beijing (CN); Xin Guo, Beijing (CN)

(73) Assignee: SONY GROUP CORPORATION, Tokyo (JP)

(\*) Notice: Subject to any disclaimer, the term of this patent is extended or adjusted under 35 U.S.C. 154(b) by 50 days.

This patent is subject to a terminal disclaimer.

(21) Appl. No.: 17/356,566

(22) Filed: Jun. 24, 2021

(65) Prior Publication Data

US 2021/0321418 A1 Oct. 14, 2021

Related U.S. Application Data

(63) Continuation of application No. 16/649,667, filed as application No. PCT/CN2018/121199 on Dec. 14, 2018, now Pat. No. 11,082,987.

(30) Foreign Application Priority Data

Dec. 20, 2017 (CN) .......................... 201711385366.5

(51) Int. Cl.
*H04W 72/541* (2023.01)
(52) U.S. Cl.
CPC ................. *H04W 72/541* (2023.01)

(58) Field of Classification Search
CPC .................................................. H04W 72/082
(Continued)

(56) References Cited

U.S. PATENT DOCUMENTS 11,082,987 B2\* 8/2021 Sun ........................ H04W 16/10
2014/0362897 A1 12/2014 Gunasekara et al.
(Continued)

FOREIGN PATENT DOCUMENTS

CN 103444218 A 12/2013
CN 104219674 A 12/2014
(Continued)

OTHER PUBLICATIONS

International Search Report and Written Opinion dated Mar. 6, 2019 for PCT/CN2018/121199 filed on Dec. 14, 2018, 8 pages.

*Primary Examiner* — Nghi H Ly
(74) *Attorney, Agent, or Firm* — XSENSUS LLP

(57) ABSTRACT

Disclosed are a wireless communication method and a wireless communication device. Provided is a resource management device, comprising one or a plurality of processors, said processor or processors being configured to: obtain interference information from another resource management device, said interference information comprising mutual interference between a plurality of managed systems managed by the resource management device, and interference of a plurality of managed systems by one or a plurality of non-managed systems not managed by the resource management device; determine a communication resource for each managed system on the basis of the obtained interference information; and notify a corresponding managed system of the determined communication resource.

15 Claims, 6 Drawing Sheets

(58) Field of Classification Search
USPC ......... 455/450, 422.1, 418, 423, 451, 452.1, 455/452.2
See application file for complete search history.

(56) References Cited

U.S. PATENT DOCUMENTS

2016/0056908 A1     2/2016  Sun
2017/0339705 A1*   11/2017  Zhao .................... H04L 5/0073

FOREIGN PATENT DOCUMENTS

CN          105338632 A      2/2016
CN          105992216 A     10/2016

* cited by examiner

WIRELESS COMMUNICATION METHOD AND WIRELESS COMMUNICATION DEVICE

CROSS-REFERENCE TO RELATED APPLICATIONS

The present application is a continuation of U.S. application Ser. No. 16/649,667, filed Mar. 23, 2020, which is based on PCT filing PCT/CN2018/121199, filed Dec. 14, 2018, which claims priority to CN 201711385366.5, filed Dec. 20, 2017, the entire contents of each are incorporated herein by reference.

FIELD

The present disclosure relates to a wireless communication method and a wireless communication device, and in particular to a method and an apparatus for assigning a communication resource to a secondary system.

BACKGROUND

With the development of wireless communication technology, users are increasingly demanding for services with high-quality and high-speed, which results in a demand for a large amount of communication resources (such as time, frequency). In order to make full use of the communication resource, a dynamic spectrum utilization technique has been developed, which dynamically utilizes spectrum resources that have been allocated to a certain service but are not fully utilized by the service. For example, spectrum of certain channels on which no program is played or spectrum of an adjacent channel in the digital television broadcast spectrum may be dynamically utilized to perform mobile communication without interfering with transmission of television signals. In this example, a digital television broadcast system may be referred to as a primary system, a television set may be referred to as a primary user, a mobile communication system that dynamically utilizes spectrum resources that are not being utilized is referred to as a secondary system, and a mobile communication terminal may be referred to as a secondary user.

That is, the primary system usually refers to a system that has spectrum utilizing license, for example, the above television broadcast system. The secondary system usually refers to a system that does not have the spectrum utilizing license and may appropriately utilize a spectrum resource allocated to the primary system when it is not used by the primary system. In addition, the primary system and the secondary system may both have spectrum utilizing licenses, but may have different priorities in utilizing spectrums. For example, when an operator deploys a new base station to provide a new service, an existing base station and its service may have priority in using spectrums. The primary system includes the primary user and a base station for the primary user. The secondary system includes the secondary user and a base station for the secondary user. Specifically, the base station for the secondary user may communicate with one or more secondary users, or a plurality of secondary users may communicate with each other in the secondary system.

In a communication scenario where the primary and secondary systems coexist, it is required that the communication of the secondary system should not adversely affect the communication of the primary system, or that the interference to the primary system caused by the secondary system utilizing the resource should be controlled to be within a range allowed by the primary system. In the case of multiple secondary systems, it is required that the aggregated interference caused by the multiple secondary systems should not exceed the range allowed by the primary system.

SUMMARY

An apparatus and a method for assigning a communication resource (for example, spectrum resource) to a secondary system are provided according to the present disclosure. According to an aspect of the present disclosure, a resource management apparatus is provided, which includes one or more processors. The one or more processors are configured to: acquire interference information from another resource management apparatus, the interference information including mutual interferences among a plurality of managed systems managed by the resource management apparatus and interferences of one or more non-managed systems not managed by the resource management apparatus to the plurality of managed systems; determine a communication resource for each of the managed systems based on the acquired interference information; and notify the corresponding managed system of the determined communication resource.

According to another aspect of the present disclosure, a resource management apparatus is provided, which includes one or more processors. The one or more processors are configured to: recognize managed systems and non-managed systems among a plurality of systems based on information reported by the plurality of systems and indicating whether each system is managed by another resource management apparatus; and determine mutual interferences among the managed systems and interference of the non-managed systems to the managed systems based on position information reported by each system, to generate interference information.

According to another aspect of the present disclosure, a method performed by a resource management apparatus for assigning resources is provided, which includes: acquiring interference information from another resource management apparatus, the interference information including mutual interferences among a plurality of managed systems managed by the resource management apparatus and interferences of one or more non-managed systems not managed by the resource management apparatus to the plurality of managed systems; determining a communication resource for each of the managed systems based on the acquired interference information; and notifying the corresponding managed system of the determined communication resource.

According to another aspect of the present disclosure, a method performed by a resource management apparatus is provided, which includes: recognizing managed systems and non-managed systems among a plurality of systems based on information reported by the plurality of systems and indicating whether each system is managed by another resource management apparatus; and determining mutual interferences among the managed systems and interferences of the non-managed systems to the managed systems based on position information reported by each system, to generate interference information.

According to another aspect of the present disclosure, a computer readable medium including executable instructions is provided. The instructions, when being executed by an information processing machine, cause the information processing machine to perform the above methods.

BRIEF DESCRIPTION OF THE DRAWINGS

The present disclosure may be understood better with reference to the detail description given in conjunction with the drawings in the following. The same or similar element is indicated by the same or similar reference numeral throughout all the drawings. The drawings together with the following detailed description are incorporated into and form a part of the specification and serve to further illustrate the preferred embodiments of the present disclosure and to explain the principle and advantages of the present disclosure by way of example. In the drawings.

DETAILED DESCRIPTION OF EMBODIMENTS

Figure 1:
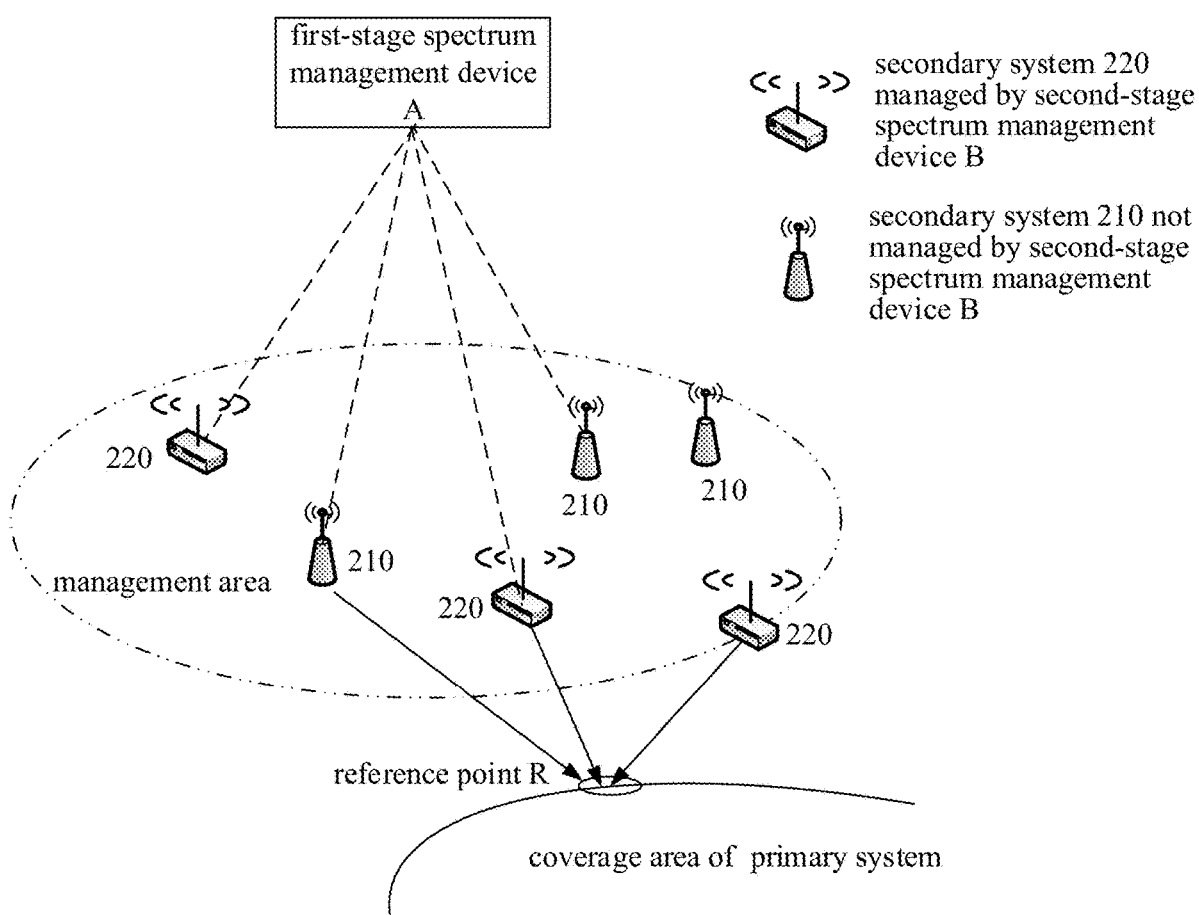
FIG. 1 schematically shows a communication scenario to which the present disclosure is applicable.

FIG. 1 schematically shows a communication scenario to which the present disclosure is applicable. In the communication scenario, there may be one or more first-stage spectrum management devices A, and each of the first-stage spectrum management devices A is configured to manage a plurality of secondary systems within a certain geographic area. FIG. 1 schematically shows only one first-stage spectrum management device A, and a geographical area managed by the first-stage spectrum management device A is indicated with a dashed circle. It should be noted that the communication scenario to which the present disclosure is applicable may include more than one first-stage spectrum management devices A.

There are multiple secondary systems in a management area managed by the first-stage spectrum management device A, and some of the multiple secondary systems may be further managed by a second-stage spectrum management device B. FIG. 1 schematically shows secondary systems 220 that are managed by the second-stage spectrum management device B and secondary systems 210 that are not managed by the second-stage spectrum management device B.

In addition, FIG. 1 also schematically shows a coverage area of a primary system and a reference point R at an edge of the coverage area. For example, the reference point R may be set at a position where the coverage area of the primary system is closest to a coverage area of the multiple secondary systems, and thus the reference point R may represent a position where interference of the secondary systems to the primary system is maximum. Therefore, interference caused by the secondary systems at the reference point R is generally considered in the controlling of aggregated interference caused by the secondary systems to the primary system.

The first-stage spectrum management device A is configured to assign available communication resources (for example, available spectrum resources) to each secondary system in the management area of the first-stage spectrum management device A. The first-stage spectrum management device A may be for example a spectrum assignment device provided by a geographic location database operator authorized in accordance with national regulations.

The second-stage spectrum management device B is configured to further determine a communication resource to be used by the secondary system 220 among the available communication resources assigned to each secondary system 220 managed by the second-stage spectrum management device B. The second-stage spectrum management device B may be for example a spectrum assignment device provided by a network operator or a network provider, or a spectrum assignment device provided by a network management organization in a specific area (such as office area, residential area, and university campus).

The second-stage spectrum management device B does not prescribe which one of first-stage spectrum management devices the secondary system 220 managed by the second-stage spectrum management device B can access, but only determine the communication resource to be used by the secondary system 220 among the available communication resources assigned to the secondary system 220.

The secondary system 210 that is not managed by the second-stage spectrum management device B may select by itself a communication resource among the available communication resources assigned by the first-stage spectrum management device A to the secondary system 210. In this case, if the second-stage spectrum management device B assigns the same communication resource to the secondary system 220 managed by the second-stage spectrum management device B as an adjacent non-managed secondary system 210, the secondary system 210 and the secondary system 220 may interfere with each other. Therefore, it is required to avoid assigning a communication resource used by the non-managed secondary system 210 that may cause interference when the second-stage spectrum management device B assigns a communication resource to the secondary system 220 managed by the second-stage spectrum management device B. Hereinafter, the present disclosure is described below by taking a spectrum resource as an example of the communication resource. However, those skilled in the art may easily apply the present disclosure described below to communication resources in other forms.

According to the present disclosure, when assigning the communication resource to the secondary systems 220 managed by the second-stage spectrum management device B, the second-stage spectrum management device B considers both a possibility that the secondary systems 220 managed by the second-stage spectrum management device B interfere with each other and a possibility that the non-managed secondary systems 210 interfere with the managed secondary systems 220.

A process of signaling interaction for assigning a communication resource to a secondary system according to an embodiment of the present disclosure is described below with reference to FIG. 2.

Figure 2:
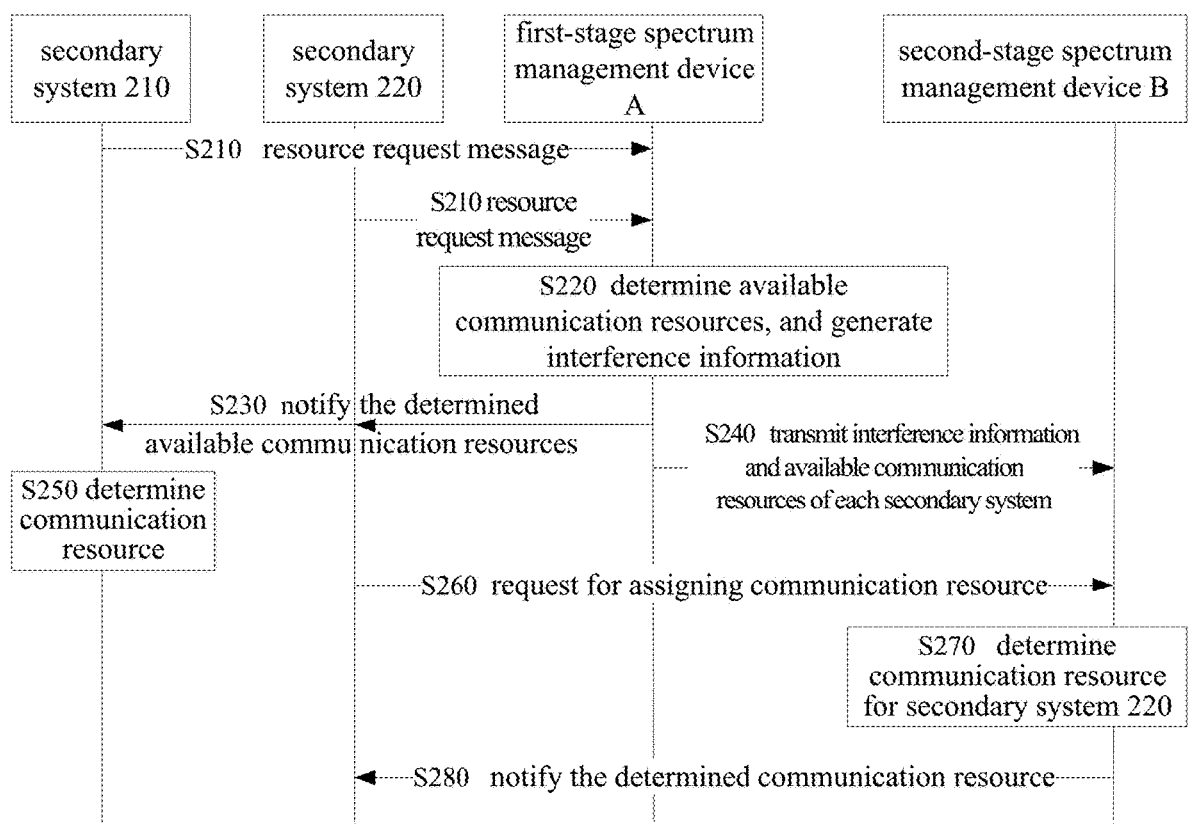
FIG. 2 is a diagram of signaling interaction for assigning communication resources according to an embodiment of the present disclosure.

As shown in FIG. 2, in step 210, in a case that communication is to be performed, the secondary system transmits a request message to the first-stage spectrum management device A for assigning available communication resources (available spectrum resources). Specifically, the secondary system that transmits the request message may include the secondary system 210 that is not managed by the second-stage spectrum management device B and the secondary system 220 that is managed by the second-stage spectrum management device B.

The request message transmitted by the secondary system may include for example identification (ID), position information, radio frequency information (for example, transmission template) of the secondary system, and information indicating whether the secondary system is managed by the second-stage spectrum management device B. The request message transmitted by the managed secondary system 220 may further include an identification (ID) of the second-stage spectrum management device B.

In step S220, in response to the request message of each secondary system, the first-stage spectrum management device A calculates, based on the position information and the radio frequency information of each secondary system, aggregated interference of the secondary systems that transmit request messages to the primary system (for example, the reference point R), and determines available spectrum resources for each secondary system based on the aggregated interference. This process may be implemented by the skilled in the art in any known and appropriate manner, which is not described in detail herein.

Further, in step S220, the first-stage spectrum management device A also generates interference information indicating mutual interferences among the respective secondary systems 210 and 220 based on information included in the received request messages. Specifically, the interference information may indicate mutual interferences among multiple secondary systems 220 managed by the second-stage spectrum management device B, interferences of (one or more) non-managed secondary systems 210 to each managed secondary system 220, and interferences of (one or more) managed secondary systems 220 to each non-managed secondary system 210. In particular, since the non-managed secondary system 210 determines a to-be-used spectrum resource by itself, and it is unnecessary for the second-stage spectrum management device B to optimize spectrum assignment for the non-managed secondary system 210, the interference of the managed secondary systems 220 to the non-managed secondary systems 210 is generally not taken into consideration in the present disclosure.

Since the request message includes information indicating whether the secondary system is managed by the second-stage spectrum management device B, the first-stage spectrum management device A may recognize the managed secondary system 220 and the non-managed secondary system 210 based on the information. Further, since the request message includes the position information of each secondary system, the first-stage spectrum management device A may determine interferences among the secondary systems based on the position information of each secondary system. For example, the first-stage spectrum management device A may determine that two managed secondary systems 220 with a distance less than a predetermined threshold therebetween interfere with each other. In addition, for example, the first-stage spectrum management device A may determine that one or more non-managed secondary systems 210 within a predetermined distance from a managed secondary system 220 interfere with the managed secondary system 220. Furthermore, the first-stage spectrum management device A may determine strength of interference of a non-managed secondary system to a managed secondary system based on a distance between the managed secondary system 220 and each non-managed secondary system 210 which causes interference to the managed secondary system 220 and/or an antenna gain of the non-managed secondary system 210, and include the determined strength of interference in the interference information.

Figure 3:
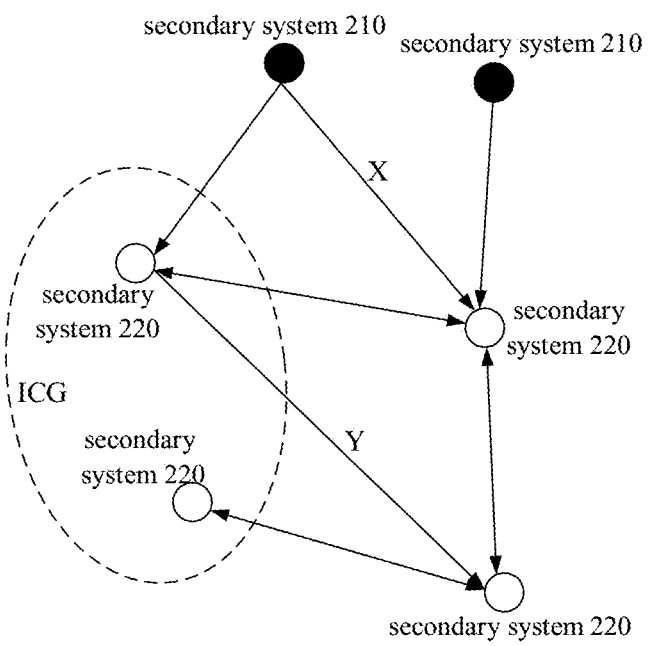
FIG. 3 shows a graph representation of interference information.

FIG. 3 schematically shows a graph representation of interference information generated by the first-stage spectrum management device A. In FIG. 3, the secondary systems 220 managed by the second-stage spectrum management device B are represented by colorless dots, and the secondary systems 210 not managed by the second-stage spectrum management device B are represented by black dots. Interferences among the secondary systems are represented by arrowed connection lines among dots, and the arrowed connection lines also indicate interference sources and objects which are interfered with. The strength of interference is represented by symbols "X" and "Y" marked on the connection lines. For example, the strength of interference may be expressed by a product of an antenna gain of interference source and a loss of transmission path between the interference source and an object which is interfered with.

It should be noted that although the direction of interference is shown by arrowed connection lines in FIG. 3, a non-directional graph that does not indicate any direction of interference may be used in the present disclosure. In addition, as described above, since the non-managed secondary systems 210 determine the to-be-used spectrum resource by itself, interference caused by the managed secondary systems 220 to the non-managed secondary systems 210 is generally not taken into consideration in the present disclosure. Therefore, interference of the managed secondary systems 220 to the non-managed secondary systems 210 is not shown in FIG. 3.

In addition, FIG. 3 also shows an interference coordination group (ICG) formed by two managed secondary systems 220. The interference coordination group is represented by a dashed circle. The secondary systems 220 in the interference coordination group may autonomously coordinate to eliminate mutual interference therebetween, so that the second-stage spectrum management device B may ignore the mutual interference between the two managed secondary systems 220 when assigning spectrum resources to the two managed secondary systems 220. That is, it may be considered that the two managed secondary systems 220 may autonomously coordinate to solve the problem of mutual interference therebetween. For example, the problem of mutual interference between the two managed secondary systems 220 may be solved with a management mechanism implemented by an operator, or may be solved by different operators using network-assisted interference cancellation technology (NAICT) in LTE. Therefore, in FIG. 3, there is no connection line representing interference between the two secondary systems 220 in the ICG.

Returning to FIG. 2, after step S220 is performed, the first-stage spectrum management device A notifies each secondary system of available spectrum resources determined for the secondary system in step S230. The first-stage spectrum management device A transmits the generated interference information and the available communication resources for each secondary system (including the secondary system 210 and the secondary system 220) to the second-stage spectrum management device B In step S240. It should be noted that an order in which steps S230 and S240 are performed is not limited to that shown in FIG. 2, and steps S230 and S240 may be performed in a reverse order or simultaneously.

Then, in step S250, the secondary system 210 that is not managed by the second-stage spectrum management device B selects by itself a spectrum resource among the received available spectrum resources for communication.

In addition, in step S260, the secondary system 220 that is managed by the second-stage spectrum management device B requests the second-stage spectrum management device B to assign a spectrum resource.

In response to a request of each secondary system 220, the second-stage spectrum management device B determines a spectrum resource to be used by the secondary system 220 among the available spectrum resources of the secondary system 220 based on the received interference information, as shown in step S270.

Process of step S270 is described in detail herein. For a specific secondary system 220, the second-stage spectrum management device B may determine one or more non-managed secondary systems 210 that cause interference to the specific secondary system 220 based on the interference information received in step S240. It is assumed that there is one non-managed secondary system 2101 that causes interfere to the specific secondary system 220 herein. In addition, the second-stage spectrum management device B may acquire, based on the available spectrum resources received in step S240, ranges of spectrum resources that are available to the specific secondary system 220 and the secondary system 2101 that causes interfere to the specific secondary system 220. It is assumed that the available spectrum resources of the specific secondary system 220 include spectrum 1, spectrum 2 and spectrum 3, and the available spectrum resources of the secondary system 2101 include spectrum 1, spectrum 3 and spectrum 4, as shown in Table 1 below. Further, it is considered that probabilities that the secondary system 2101 uses each of the spectrums 1, 3, and 4 in the available spectrum resources are equal to each other, for example, each of the probabilities is ⅓.

TABLE 1

| Specific secondary system 220 | Spectrum 1 | Spectrum 2 | Spectrum 3 |
|---|---|---|---|
| Secondary system 2101 | Spectrum 1 | | Spectrum 3 Spectrum 4 |

In this case, a probability that the secondary system 2101 uses the spectrum 1 in the available spectrum resources of the specific secondary system 220 is first calculated as ⅓. A probability that the secondary system 2101 uses the spectrum 2 is then calculated. Since the available spectrum resources of the secondary system 2101 do not include the spectrum 2, the probability that the secondary system 2101 uses the spectrum 2 is equal to 0. Similarly, a probability that the secondary system 2101 uses the spectrum 3 is calculated as ⅓.

It can be seen that among the available spectrum resources of the specific secondary system 220, the probability that the spectrum 2 is used by the non-managed secondary system 2101 is minimum (0). This means that, if the specific secondary system 220 uses the spectrum 2 for communication, a possibility that the specific secondary system 220 uses the same spectrum as the secondary system 2101 is minimum, and thus a possibility that the specific secondary system 220 is subjected to the interference from the secondary system 2101 is minimum (0). Therefore, the second-stage spectrum management device B may assign the spectrum 2 to the specific secondary system 220 for communication.

In a variation of the above example, it is assumed that the available spectrum resources of the secondary system 2101 include only the spectrum 3 and the spectrum 4, as shown in Table 2 below.

TABLE 2

| Specific secondary system 220 | Spectrum 1 | Spectrum 2 | Spectrum 3 |
|---|---|---|---|
| Secondary system 2101 | | | Spectrum 3 Spectrum 4 |

Similarly, a probability that each of an available spectrum 1, an available spectrum 2 and an available spectrum 3 of the specific secondary system 220 is used by the secondary system 2101 is calculated. It can be seen that the probability of each of the spectrum 1 and the spectrum 2 being used is smaller than the probability of the spectrum 3 being used, and the probability of the spectrum 1 being used is equal to the probability of the spectrum 2 being used (both are equal to 0). In this case, the second-stage spectrum management device B may select any one of the spectrum 1 and the spectrum 2 to assign to the specific secondary system 220.

In addition, those skilled in the art should easily understand that, if the available spectrum resources of the specific secondary system 220 include a spectrum that is not included in the available spectrum resources of the secondary system 2101, the second-stage spectrum management device B may assign the spectrum to the specific secondary system 220.

In the above example, it is assumed that there is only one non-managed secondary system that causes interfere to the specific secondary system 220. A case that there are multiple non-managed secondary systems causing interference is described in the following.

In an example, it is assumed that the available spectrum resources of the specific secondary system 220 include spectrum 1, spectrum 2 and spectrum 3, and there are three secondary systems that cause interferes to the specific secondary system 220, namely, a secondary system 2101, a secondary system 2102, and a secondary system 2103. Available spectrum resources of the secondary system 2101 include spectrum 1, spectrum 3, and spectrum 4, available spectrum resources of the secondary system 2102 include spectrum 2 and spectrum 3, and available spectrum resources of the secondary system 2103 include spectrum 2, spectrum 3, and spectrum 4, as shown in Table 3 below. In addition, for each of the secondary systems 2101, 2102, and 2103, it is considered that probabilities that the secondary system uses respective spectrums included in the available spectrum resources are equal to each other. For example, it is considered that probabilities that the secondary system 2101 uses the spectrum 1, the spectrum 3, and the spectrum 4 in the available spectrum resources are equal to each other, and each of the probabilities is equal to ⅓.

TABLE 3

| Specific secondary system 220 | Spectrum 1 | Spectrum 2 | Spectrum 3 |
|---|---|---|---|
| Secondary system 2101 | Spectrum 1 | | Spectrum 3 Spectrum 4 |
| Secondary system 2102 | | Spectrum 2 | Spectrum 3 |
| Secondary system 2103 | | Spectrum 2 | Spectrum 3 Spectrum 4 |

In this case, for the spectrum 1 in the available spectrum resources of the specific secondary system 220, a probability that each of the secondary systems 2101, 2102, and 2103 uses the spectrum 1 is first calculated, and three probabilities respectively equal to ⅓, 0, and 0 are obtained. Then, for the spectrum 2 in the available spectrum resources of the specific secondary system 220, a probability that each of the secondary systems 2101, 2102, and 2103 uses the spectrum 2 is calculated, and probabilities respectively equal to 0, ½, and ⅓ are obtained. Similarly, for the spectrum 3 in the available spectrum resources of the specific secondary system 220, a probability that each of the secondary systems 2101, 2102, and 2103 uses the spectrum 3 is calculated, and probabilities respectively equal to ⅓, ½, and ⅓ are obtained.

It can be seen from Table 3 that, among the available spectrum resources of the specific secondary system 220, the probability that the spectrum 1 is used by the secondary systems 2101, 2102 and 2103 is minimum. This means that, if the specific secondary system 220 uses the spectrum 1 for communication, a probability that the specific secondary system 220 uses the same spectrum as the secondary systems 2101, 2102, and 2103 is minimum, and thus a probability that the specific secondary system 220 is subjected to interferences caused by the secondary systems 2101, 2102, and 2103 is minimum. Therefore, the second-stage spectrum management device B may assign the spectrum 1 to the specific secondary system 220 for communication.

It should be noted that, it can be apparently seen from Table 3 that the probability of the spectrum 1 being used is minimum. However, in a more general case, a total probability of the spectrum 1 being used may be calculated based the probabilities of ⅓, 0 and 0 that the spectrum 1 is used by the secondary systems 2101, 2102, and 2103. The total probability is a function of the probabilities of ⅓, 0 and 0. For example, the total probability is a value obtained through an adding operation, or a weighting and adding operation, or other operations on the probabilities of ⅓, 0 and 0. Similarly, a total probability that each of the spectrum 2 and the spectrum 3 is used may be calculated. Then, the spectrum corresponding to a minimum total probability is assigned to the specific secondary system 220.

In addition, those skilled in the art should easily understand that if the available spectrum resources of the specific secondary system 220 further include spectrum 5 that is not included in the available spectrum resources of any one of the secondary systems 2101, 2102, and 2103, the specific secondary system 220 may be not subjected to interferences from the secondary systems 2101, 2102, and 2103 when using the frequency band 5 for communication. Therefore, the second-stage spectrum management device B assigns the spectrum 5 to the specific secondary system 220 for communication.

In a variation of the above example, it is assumed that available spectrum resources of the specific secondary system 220 include spectrum 1, spectrum 2 and spectrum 3, available spectrum resources of the secondary system 2101 include spectrum 1, spectrum 3 and spectrum 4, available spectrum resources of the secondary system 2102 include spectrum 2, spectrum 3, and spectrum 5, and available spectrum resources of the secondary system 2103 include spectrum 1, spectrum 2, spectrum 3, and spectrum 4, as shown in Table 4 below.

trum 1 is used by the secondary systems 2101, 2102, and 2103 are respectively equal to ⅓, 0, and ¼, probabilities of the spectrum 2 being used are respectively equal to 0, ⅓, and ¼, and probabilities of the spectrum 3 being used are respectively equal to ⅓, ⅓, and ¼. It can be seen from Table 4 that the probability of spectrum 3 being used is maximum. Probabilities of the spectrum 1 and the spectrum 2 being used are small and are equal to each other. In this case, the second-stage spectrum management device B may select any one of the spectrum 1 and the spectrum 2 to assign to the specific secondary system 220.

It should be noted that, it can be apparently seen from Table 4 that the probability of the spectrum 3 being used is maximum, and probabilities of the spectrum 1 and the spectrum 2 being used are small and are equal to each other. However, in a more general case, for each spectrum, a total probability that the spectrum is used may be calculated based on probabilities that the spectrum is used by the secondary systems 2101, 2102, and 2103, as described above in conjunction with Table 3. A spectrum to be assigned to the specific secondary system 220 is then selected based on the total probability of each spectrum being used.

Alternatively, for the case shown in Table 4, if the interference information received by the second-stage spectrum management device B further includes strength of interference of each of the secondary systems 2101, 2102 and 2103 to the specific secondary system 220, the second-stage spectrum management device B may select one of the spectrum 1 and the spectrum 2 based on the strength of interference, instead of randomly selecting one of the spectrum 1 and the spectrum 2, and assign it to the specific secondary system 220. It is assumed that strengths of interference of the secondary systems 2101, 2102, and 2103 to the specific secondary system 220 are expressed by A, B, and C respectively, and A>B>C. In this case, the spectrum 1 may be used by the secondary system 2101 (with the maximum strength A of interference) and the secondary system 2103 (with the minimum strength C of interference). The spectrum 2 may be used by the secondary system 2102 (with the medium strength B of interference) and the secondary system 2103 (with the minimum strength C of interference). Therefore, the second-stage spectrum management device B may assign the spectrum 2 to the specific secondary system 220, for the reason that although the probability that the specific secondary system 220 is subjected to interference when using the spectrum 1 for communication is equal to the probability that the specific secondary system 220 is subjected to interference when using the spectrum 2 for communication, the strength of interference that the specific secondary system 220 uses the spectrum 2 for communication is less than the strength of

TABLE 4

| | Spectrum 1 | Spectrum 2 | Spectrum 3 | Spectrum 4 | Spectrum 5 |
|---|---|---|---|---|---|
| Specific secondary system 220 | Spectrum 1 | Spectrum 2 | Spectrum 3 | | |
| Secondary system 2101 | Spectrum 1 | | Spectrum 3 | Spectrum 4 | |
| Secondary system 2102 | | Spectrum 2 | Spectrum 3 | | Spectrum 5 |
| Secondary system 2103 | Spectrum 1 | Spectrum 2 | Spectrum 3 | Spectrum 4 | |

In the above example, for each of the spectrum 1, the spectrum 2, and the spectrum 3 available to the specific secondary system 220, a probability that the spectrum is used by each of the secondary systems 2101, 2102, and 2103 is calculated. It is obtained that probabilities that the specinterference that the specific secondary system 220 uses the spectrum 1 for communication.

After assigning spectrum resources to secondary systems among the secondary systems managed by the second-stage spectrum management device B that are subjected to interference from non-managed secondary systems, the second-stage spectrum management device B may assign spectrum resources to the other managed secondary systems that are not subjected to interference from any non-managed secondary system. For example, the second-stage spectrum management device B may determine, based on interferences among the managed secondary systems indicated by the received interference information, the spectrum resources for the managed secondary systems that are not subjected to interference from any non-managed secondary system by a coloring algorithm.

In the above example, the second-stage spectrum management device B determines the spectrum resources for each of the secondary systems 220 managed by the second-stage spectrum management device B. Then, in step S280, the second-stage spectrum management device B notifies the corresponding secondary system 220 of the determined spectrum resources.

A process of signaling interaction for assigning a communication resource to a secondary system according to another embodiment of the present disclosure is described below with reference to FIG. 4.

Figure 4:
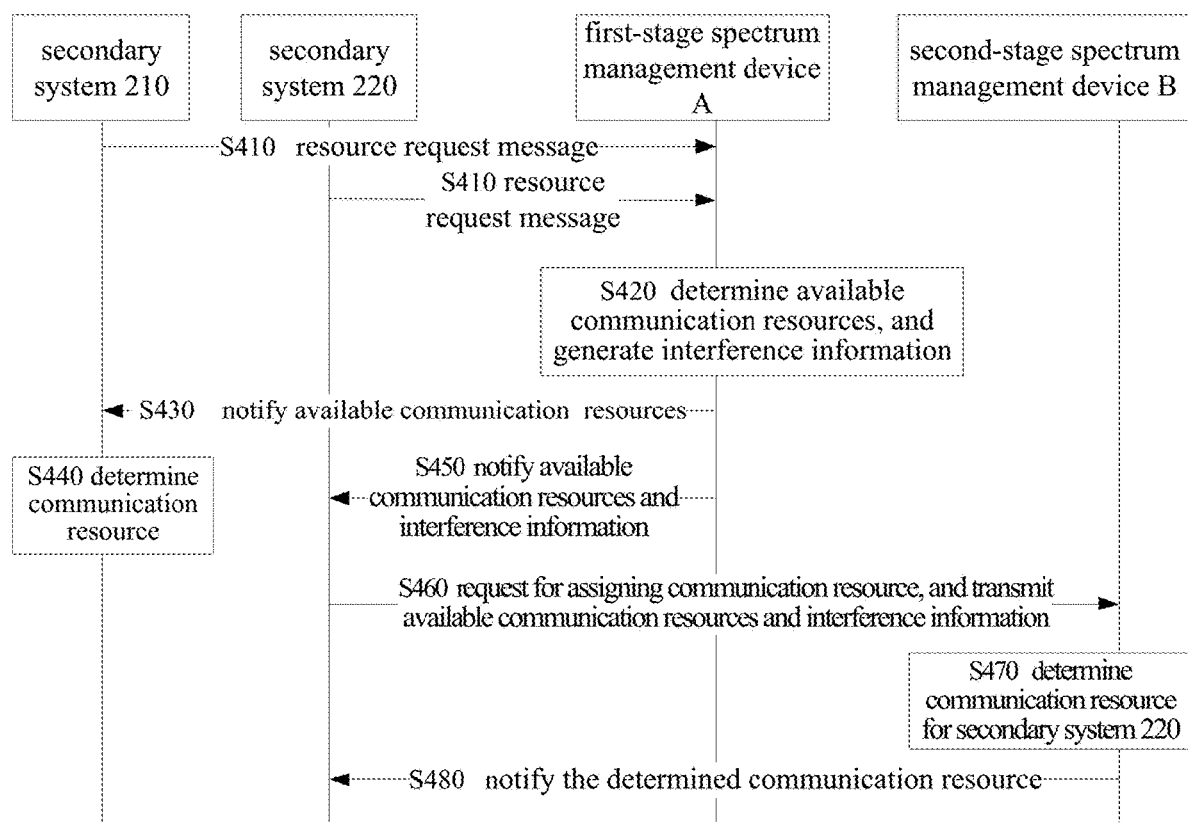
FIG. 4 is a diagram of signaling interaction for assigning communication resources according to another embodiment of the present disclosure.

As shown in FIG. 4, in step 410, when communication is required, a secondary system transmits a request message to the first-stage spectrum management device A for assigning available spectrum resources. The secondary system includes a secondary system 210 that is not managed by a second-stage spectrum management device B and a secondary system 220 that is managed by the second-stage spectrum management device B. For example, the request message may include identification (ID), location information, radio frequency information of the secondary system, and information indicating whether the secondary system is managed by the second-stage spectrum management device B. Therefore, the first-stage spectrum management device A may recognize the managed secondary system 220 and the non-managed secondary system 210 based on the received request message. The request message transmitted by a managed secondary system 220 may further include an identification (ID) of the second-stage spectrum management device B that manages the secondary system 220.

In step S420, the first-stage spectrum management device A calculates aggregated interference of each secondary system transmitting the request message to the primary system (for example, the reference point R) based on the received request message, and determines available spectrum resources for each secondary system based on the aggregated interference. In addition, the first-stage spectrum management device A also generates interference information indicating mutual interferences among the secondary systems 210 and 220 based on the information included in the received request message. The processes of steps S410 and S420 are the same as steps S210 and S220 as shown in FIG. 2, and are not described in detail herein.

Then, in step S430, the first-stage spectrum management device A notifies the non-managed secondary system 210 of the available spectrum resources determined for the non-managed secondary system 210. Then, the secondary system 210 selects by itself a spectrum resource among the received available spectrum resources for communication, as shown in step S440.

Further, in step S450, the first-stage spectrum management device A transmits the available spectrum resources determined for each secondary system (including the secondary system 210 and the secondary system 220) and the generated interference information to the secondary system 220. It should be noted that the timing when step S450 is performed is not limited to that shown in the drawings. For example, step S450 and step S430 may be performed simultaneously, or step S450 may be performed before step S430.

In step S460, the secondary system 220 requests the second-stage spectrum management device B to assign spectrum resources, and transmits the available spectrum resources of each secondary system and the interference information that are received from the first-stage spectrum management device A to the second-stage spectrum management device B.

In step S470, in response to the request of each secondary system 220, the second-stage spectrum management device B determines a spectrum resource to be used by the secondary system 220 among the available spectrum resources of the secondary system 220, based on the received interference information. In step S480, the second-stage spectrum management device B notifies the corresponding secondary system 220 of the determined spectrum resource. Processes of steps S470 and S480 are the same as steps S270 and S280 as shown in FIG. 2, and are not described in detail herein.

The processing shown in FIG. 4 may be applicable to a case that the first-stage spectrum management device A cannot directly communicate with the second-stage spectrum management device B.

Returning to FIG. 3, as described above, multiple secondary systems 220 in the interference coordination group (ICG) may autonomously coordinate so as to eliminate the mutual interferences therebetween. Therefore, the second-stage spectrum management device B may assign the same spectrum resource to the multiple secondary systems 220. When using the same spectrum resource, the secondary systems 220 in the ICG belong to the same common channel group (CCG).

Figure 5A:
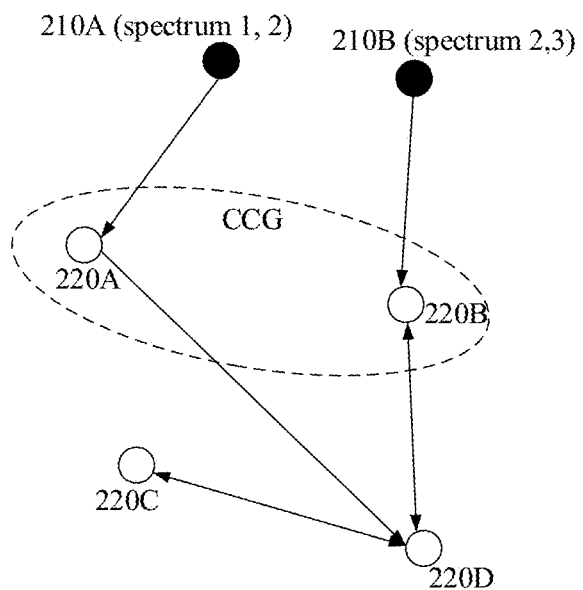
FIG. 5A schematically shows a common channel group.
Figure 5B:
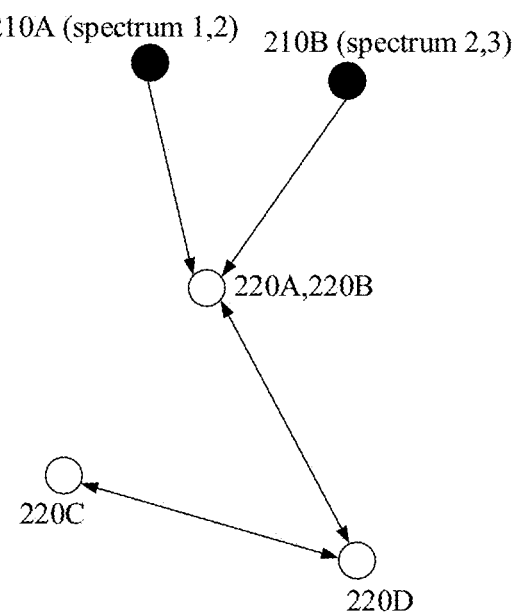
FIG. 5B is a simplified diagram of FIG. 5A.

FIG. 5A schematically shows a common channel group. As shown in FIG. 5A, there are four secondary systems 220A, 220B, 220C, and 220D that are managed by the second-stage spectrum management device B. The second-stage spectrum management device B divides the secondary systems 220A and 220B into a CCG based on characteristics of the secondary systems or a request. Since the same spectrum is used, the secondary systems 220A and 220B in one CCG may be considered as a whole. Therefore, FIG. 5A may be simplified into FIG. 5B. In FIG. 5B, the secondary systems 220A and 220B are simply represented by one dot.

In the conventional technology, the interference of nearby non-managed secondary systems (for example, the secondary systems 210A and 210B) to the managed secondary systems (for example, the secondary systems 220A, and 220B) is usually not taken into consideration when forming a CCG and assigning a spectrum to the CCG. For example, as shown in FIG. 5A, the secondary system 220A is subject to interference from the non-managed secondary system 210A (with the available spectrums 1 and 2), and the secondary system 220B is subject to interference from the non-managed secondary system 210B (with the available spectrums 2 and 3), which are not taken into consideration in the conventional technology. Therefore, any one of the spectrum 1, the spectrum 2 and the spectrum 3 may be assigned to the CCG that is formed by the secondary systems 220A and 220B. In this case, at least one secondary system (the secondary system 220A, or the secondary system 220B, or both of the secondary systems 220A and 220B) in the CCG is subject to interference from the secondary system 210A or 210B.

According to the present disclosure, the second-stage spectrum management device B takes interference from the non-managed secondary systems 210A and 210B into consideration when forming the CCG and assigning the spectrum to the CCG. For example, in the case shown in FIG. 5A, the second-stage spectrum management device B according to the present disclosure divides the secondary systems 220A and 220B into different CCGs rather than the same CCG. For example, the secondary system 220A and other secondary system for which the spectrum 1 and the spectrum 2 need to be avoided may be allocated to a single CCG, and a spectrum resource among the spectrum resources excluding the spectrum 1 and the spectrum 2 is assigned to this CCG. Similarly, the secondary system 220B and other secondary system for which the spectrum 2 and the spectrum 3 need to be avoided may be allocated to a single CCG, and a spectrum resource among the spectrum resources excluding the spectrum 2 and the spectrum 3 is assigned to this CCG. Alternatively, the second-stage spectrum management device B according to the present disclosure may not divide the secondary systems 220A and 220B into any CCG.

In addition, if there is one or more pre-formed CCGs, and the second-stage spectrum management device B determines that the pre-formed CCGs are inappropriate after considering interference from the non-managed secondary systems, the second-stage spectrum management device B may re-form a CCG and notify the corresponding managed secondary system of grouping information of the re-formed CCG.

Series of processing described in the above embodiments may be implemented by software, hardware, or a combination of software and hardware. Programs included in the software may be stored in advance in a storage medium arranged inside or outside each device. In an example, the programs, when being executed, are written into a random-access memory (RAM) and executed by a processor (for example, a CPU), so as to implement various processing described herein.

Figure 6:
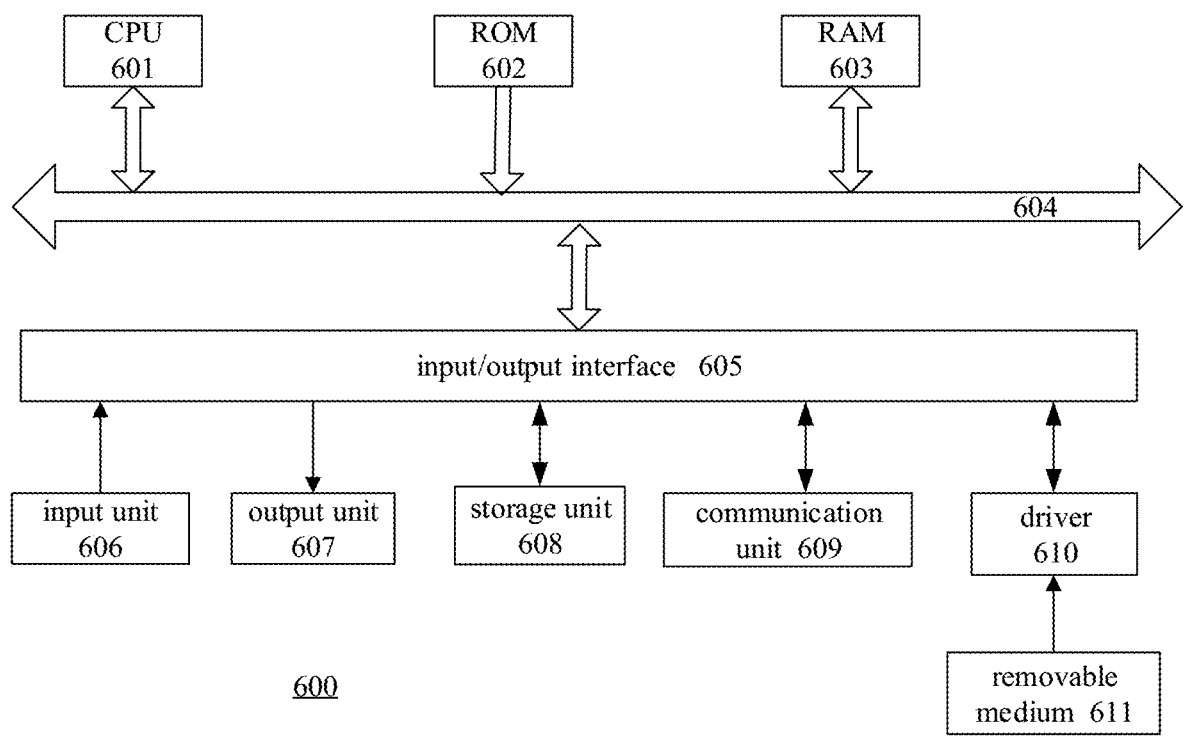
FIG. 6 is a block diagram showing an exemplary configuration of computer hardware for implementing the present disclosure.

FIG. 6 is a block diagram showing an exemplary configuration of computer hardware for implementing the present disclosure according to a program.

In a computer 600, a central processing unit (CPU) 601, a read-only memory (ROM) 602 and a random-access memory (RAM) 603 are connected to each other via a bus 604.

An input/output interface 605 is further connected to the bus 604. The input/output interface 605 is connected with the following components: an input unit 606 including keyboard, mouse, microphone and the like; an output unit 607 including display, speaker, and the like; a storage unit 608 including hard disk, non-volatile memory and the like; a communication unit 609 including network interface card (such as local area network (LAN) card and modem); and a drive 610 that drives a removable medium 611. The removable medium 611 may be magnetic disk, optical disk, magneto-optical disk, semiconductor memory or the like.

In a computer having the above configuration, the CPU 601 loads the program stored in the storage unit 608 into the RAM 603 via the input/output interface 605 and the bus 604, and executes the program to perform the above processes.

A program to be executed by a computer (the CPU 601) may be recorded on the removable medium 611 which is a package medium including, for example, magnetic disk (including floppy disk), optical disk (including compact disc-read only memory (CD-ROM), digital versatile disc (DVD) and the like), magneto-optical disc, or semiconductor memory. In addition, the program to be executed by the computer (the CPU 601) may also be provided via a wired or wireless transmission medium such as local area network, the Internet, or digital satellite broadcasting.

In a case that the removable medium 611 is installed in the drive 610, the program may be installed in the storage unit 608 via the input/output interface 605. In addition, the program may be received by the communication unit 609 via a wired or wireless transmission medium, and the program may be installed in the storage unit 608. Alternatively, the program may be installed in the ROM 602 or the storage unit 608 in advance.

The program to be executed by the computer may be a program that performs the processes in the order described herein, or may be a program that performs the processes in parallel or performs the processing when needed (such as when called).

Each device or unit described herein is only in the logical sense and does not strictly correspond to a physical device or entity. For example, a function of each unit described herein may be implemented by a plurality of physical entities, or functions of a plurality of units described herein may be implemented by a single physical entity. In addition, it should be noted that features, components, elements, steps and the like described in one embodiment are not limited to this embodiment, but may be applied to other embodiments, for example, by replacing specific features, components, elements, steps and the like in other embodiments or combining with the specific features, components, elements, steps and the like in other embodiments.

The embodiments and the technical effects of the present disclosure are described in detail above with reference to the accompanying drawings, but the scope of the present disclosure is not limited thereto. It is to be understood by those skilled in the art that various modifications or changes can be made to the embodiments described herein without departing from the spirit and scope of the present disclosure depending on design requirements and other factors. The scope of the present disclosure is defined by the appended claims or their equivalents.

In addition, the present disclosure may also be configured as follows.

A resource management apparatus, including one or more processors configured to: acquire interference information from another resource management apparatus, the interference information including mutual interferences among a plurality of managed systems managed by the resource management apparatus and interferences of one or more non-managed systems not managed by the resource management apparatus to the plurality of managed systems; determine a communication resource for each of the managed systems based on the acquired interference information; and notify the corresponding managed system of the determined communication resource.

The processors are further configured to: determine, based on the acquired interference information, a non-managed system which causes interference to each managed system; acquire, from the another resource management apparatus, available communication resources of each managed system and each non-managed system; and determine, for the available communication resources of each managed system, a possibility that a non-managed system which causes interference to the managed system uses a specific communication resource among the available communication resources, and determine the communication resource for the managed system based on the possibility.

The processors are further configured to determine a communication resource corresponding to the lowest possibility among the available communication resources as the communication resource to be used by the managed system.

The processors are further configured to determine, when a plurality of communication resources among the available communication resources correspond to the lowest possibility, any one of the plurality of communication resources as the communication resource to be used by the managed system.

The processors are further configured to: determine the possibility based on the number of resources in the available communication resources of the non-managed system which causes interference, when the available communication resources of the non-managed system include the specific communication resource; and determine the possibility to be zero, when the available communication resources of the non-managed system which causes interference do not include the specific communication resource.

The processors are further configured to: when a plurality of non-managed systems are determined to cause interference to the managed system, determine a possibility that each of the plurality of non-managed systems uses the specific communication resource; determine a total possibility that the specific communication resource is used, based on a plurality of the determined possibilities; and determine a communication resource corresponding to the lowest total possibility among the available communication resources of the managed system as the communication resource to be used by the managed system.

The processors are further configured to determine, when a plurality of communication resources among the available communication resources of the managed system correspond to the lowest total possibility, any one of the plurality of communication resources as the communication resource to be used by the managed system.

The processors are further configured to: when a plurality of communication resources among the available communication resources of the managed system correspond to the lowest total possibility, in a case where the interference information further indicates strengths of respective interference of the plurality of non-managed systems to the managed system, select one of the plurality of communication resources as the communication resource to be used by the managed system based on the strengths of interference of the non-managed systems which possibly use the plurality of communication resources.

The processors are further configured to divide some of the plurality of managed systems into one group and determine the same communication resource for the managed systems in the group, by considering the interference of the non-managed systems to the managed systems.

The processors are further configured to determine the communication resource for the managed system by a coloring algorithm based on the mutual interference among the managed systems which are indicated by the interference information.

A resource management apparatus, including one or more processors configured to: recognize managed systems and non-managed systems among a plurality of systems based on information reported by the plurality of systems and indicating whether each system is managed by another resource management apparatus; and determine mutual interferences among the managed systems and interferences of the non-managed systems to the managed systems based on position information reported by each system, to generate interference information.

The processors are further configured to determine a non-managed system within a predetermined distance from each managed system as causing interference to the managed system.

The processors are further configured to determine strength of interference of the non-managed system to the managed system based on a distance between the managed system and the non-managed system which causes interference to the managed system, and include the strength of interference in the interference information.

The processors are further configured to determine strength of interference of the non-managed system to the managed system based on an antenna gain of the non-managed system which causes interference to the managed system, and include the strength of interference in the interference information.

The processors are further configured to: determine aggregated interference caused by the plurality of systems to another system based on the position information and radio frequency information which are reported by each system, and determine available communication resources of each system based on the aggregated interference.

A method performed by a resource management apparatus for assigning resources, including: acquiring interference information from another resource management apparatus, the interference information including mutual interferences among a plurality of managed systems managed by the resource management apparatus and interferences of one or more non-managed systems not managed by the resource management apparatus to the plurality of managed systems; determining a communication resource for each of the managed systems based on the acquired interference information; and notifying the corresponding managed system of the determined communication resource.

The method further includes: determining, based on the acquired interference information, a non-managed system which causes interference to each managed system; acquiring, from the another resource management apparatus, available communication resources of each managed system and each non-managed system; and determining, for the available communication resources of each managed system, a possibility that a non-managed system which causes interference to the managed system uses a specific communication resource among the available communication resources, and determining the communication resource for the managed system based on the possibility.

The method further includes: determining a communication resource corresponding to the lowest possibility among the available communication resources as the communication resource to be used by the managed system.

The method further includes: determining the possibility based on the number of resources in the available communication resources of the non-managed system which causes interference, when the available communication resources of the non-managed system include the specific communication resource; and determining the possibility to be zero, when the available communication resources of the non-managed system which causes interference do not include the specific communication resource.

The method further includes: when a plurality of non-managed systems are determined to cause interference to the managed system, determining a possibility that each of the plurality of non-managed systems uses the specific communication resource; determining a total possibility that the specific communication resource is used, based on a plurality of the determined possibilities; and determining a communication resource corresponding to the lowest total possibility among the available communication resources of the managed system as the communication resource to be used by the managed system.

The method further includes: dividing some of the plurality of managed systems into one group and determining the same communication resource for the managed systems in the group, by considering the interference of the non-managed systems to the managed systems.

A method performed by a resource management apparatus, including: recognizing managed systems and non-managed systems among a plurality of systems based on information reported by the plurality of systems and indicating whether each system is managed by another resource management apparatus; and determining mutual interferences among the managed systems and interferences of the non-managed systems to the managed systems based on position information reported by each system, to generate interference information.

The method further includes: determining strength of interference of the non-managed system to the managed system based on at least one of a distance between the managed system and the non-managed system which causes interference to the managed system and an antenna gain of the non-managed system; and including the strength of interference in the interference information.

The method further includes: determining aggregated interference caused by the plurality of systems to another system based on the position information and radio frequency information which are reported by each system; and determining available communication resources of each system based on the aggregated interference.

A computer readable medium including executable instructions, wherein the executable instructions, when being executed by an information processing machine, cause the information processing machine to perform the above methods.

The invention claimed is:

1. A resource management apparatus comprising processing circuitry configured to:
    recognize managed systems and non-managed systems among a plurality of systems based on information reported by the plurality of systems, the information indicating whether each system is managed by another resource management apparatus;
    determine interference information indicating mutual interferences between the managed systems and the non-managed systems, wherein the interference information is determined at least in part based on position information reported by each system;
    determine available communication resources for the managed systems based on the interference information; and
    notify the another resource management apparatus of the available communication resources.

2. The resource management apparatus according to claim 1, wherein the processing circuitry is further configured to receive a request message from one of the plurality of systems, wherein the request message comprises one or more of system identification, the location information, radio frequency information, and information indicating whether the system is managed by the another resource management apparatus.

3. The resource management apparatus according to claim 2, wherein, in a case that the request message is from one of the managed systems, the request message further comprises an identification of the another resource management apparatus.

4. The resource management apparatus according to claim 1, wherein the processing circuitry is further configured to:
    determine the available communication resources for the managed systems by a coloring algorithm.

5. The resource management apparatus according to claim 4, wherein the coloring algorithm is based on the mutual interferences between the managed systems and the non-managed systems.

6. The resource management apparatus according to claim 1, wherein the processing circuitry is further configured to:
    determine that a particular non-managed system within a predetermined distance of a particular managed system interferes with the particular managed system.

7. The resource management apparatus according to claim 6, wherein the predetermined distance is determined at least in part based on the position information reported by each system.

8. The resource management apparatus according to claim 1, wherein the processing circuitry is further configured to:
    determine strengths of the mutual interferences between the managed systems and the non-managed systems.

9. A resource management method comprising:
    recognizing managed systems and non-managed systems among a plurality of systems based on information reported by the plurality of systems, the information indicating whether each system is managed by another resource management apparatus;
    determining interference information indicating mutual interferences between the managed systems and the non-managed systems, wherein the interference information is determined at least in part based on position information reported by each system;
    determining available communication resources for the managed systems based on the interference information; and
    notifying the another resource management apparatus of the available communication resources.

10. The resource management method according to claim 9, further comprising:
    determining the available communication resources for the managed systems by a coloring algorithm.

11. The resource management method according to claim 10, wherein the coloring algorithm is based on the mutual interferences between the managed systems and the non-managed systems.

12. The resource management method according to claim 9, further comprising:
    determining that a particular non-managed system within a predetermined distance of a particular managed system interferes with the particular managed system.

13. The resource management method according to claim 12, wherein the predetermined distance is determined at least in part based on the position information reported by each system.

14. The resource management method according to claim 9, further comprising:
    determining strengths of the mutual interferences between the managed systems and the non-managed systems.

15. A non-transitory computer readable medium comprising instructions that, when executed, cause a computer to:
    recognize managed systems and non-managed systems among a plurality of systems based on information reported by the plurality of systems, the information indicating whether each system is managed by another resource management apparatus;
    determine interference information indicating mutual interferences between the managed systems and the non-managed systems, wherein the interference information is determined at least in part based on position information reported by each system;
determine available communication resources for the managed systems based on the interference information; and
notify the another resource management apparatus of the available communication resources.

* * * * *